United States Patent
Bargain et al.

[11] 3,933,745
[45] Jan. 20, 1976

[54] IMIDE COPOLYMERS POSSESSING HYDROXYL GROUPS

[75] Inventors: Michel Bargain, Lyon; Maurice Ducloux, Irigny, both of France

[73] Assignee: Rhone-Poulenc S.A., Paris, France

[22] Filed: Oct. 24, 1972

[21] Appl. No.: 299,731

[30] Foreign Application Priority Data
Oct. 26, 1971 France .................. 71.38425

[52] U.S. Cl. ........... 260/47 CP; 117/72; 117/161 P; 260/30.4 N; 260/32.8 N; 260/33.4 P; 260/33.6 R; 260/65; 260/78 TF
[51] Int. Cl.² ......................... C08G 73/10
[58] Field of Search. 260/47 CP, 78 TF, 65, 30.4 N, 260/32.8 N, 33.4 P, 33.6 R

[56] References Cited
UNITED STATES PATENTS
3,609,123 9/1971 Rabilloud et al. .................. 260/47
3,793,291 2/1974 Cohen et al. .................... 260/47

*Primary Examiner*—Lester L. Lee
*Attorney, Agent, or Firm*—Stevens, Davis, Miller & Mosher

[57] ABSTRACT

Imide copolymers consisting essentially of at least

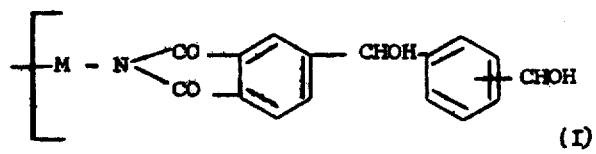

(I)

of recurring units of the formula

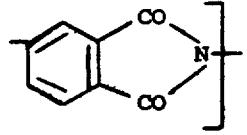

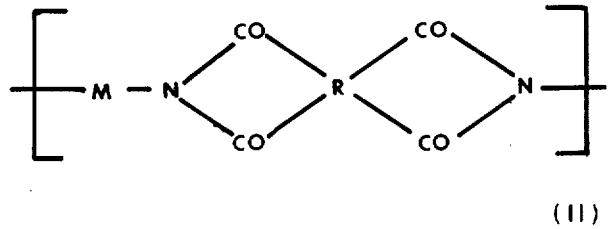

(II)

together with recurring units of the formula:
in which M represents an aliphatic, aromatic, carbocyclic or heterocyclic divalent radical and R represents a tetravalent aromatic radical are provided having special utility as adhesives for polyimide and polyimide-amide films.

10 Claims, No Drawings

IMIDE COPOLYMERS POSSESSING HYDROXYL GROUPS

The present invention relates to imide copolymers possessing hydroxyl groups which are particularly suitable for glueing heat-resistant polyimide or polyimideamide films.

Many polyimides are currently known for a variety of industrial applications. Despite their remarkable heat-resistance, these polyimides are rarely used for glueing polyimide or polyimide-amide films either because the adhesive film does not provide sufficient adhesion or because the adhesive flows when the glued films are used at a high temperature. It has been found, furthermore, that coating a polyimide or polyimide-amide film with an adhesive solution imparts a degree of brittleness to the film resulting, in particular, in a lowering of the tensile strength. Thus adhesive films based on polyimides are rarely used for glueing polyimide or polyimide-amide films and adhesive films based on fluorinated polymers, such as those described in French Patent No. 1,485,152, are preferred for them. It is observed, however, that these films impart a slight tendency to flow when glued films are exposed to a high temperature.

Polyimide copolymers which contain imide units derived from phenylene-bis-(4-hydroxymethylene-phthalic) acids, combined with other imide units derived from an organic tetracid of an aromatic nature have now been found, according to the present invention. These copolymers make it possible to glue polyimide or polyimide-amide films without flow. Furthermore, their use does not lead to substantial changes in the mechanical properties of the polyimide or polyimide-amide films.

According to the present invention, there is provided an imide copolymer consisting essentially of at least 20% of imide units derived from phenylene-bis-(4-hydroxymethylene-phthalic) acids, these units having the formula:

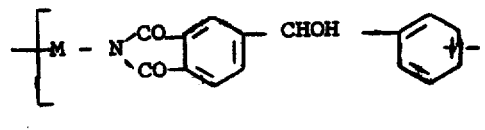

, together with other imide units of the formula;

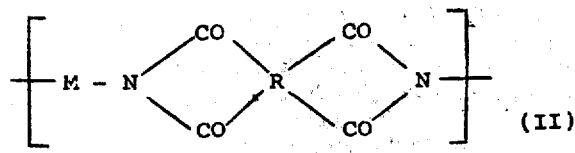

In these formulae, M represents an aliphatic, aromatic, carbocyclic or heterocyclic divalent radical and R represents an aromatic tetravalent radical.

The copolymers according to the invention which will be referred to as "copolyimides", can be statistical or sequential, the alternation or the repetition of the units being dependent upon the method of preparation (as discussed below).

The copolyimides according to this invention can be obtained by reacting a diprimary diamine of the formula (III)

$$NH_2 - M - NH_2 \qquad (III)$$

M being as defined above, simultaneously or separately with an imidisable derivative of a phenylene-bis-(4-hydroxymethylene-phthalic) acid of the formula (IV)

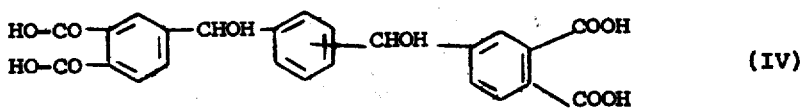

and with an imidisable derivative of an aromatic tetracid possessing anhydrisable groups, of the formula (V)

The reaction is suitably carried out in a polar solvent such as dimethylformamide, dimethylacetamide, N-methylpyrrolidone, pyridine or a higher homologue, phenol or a cresol. By an "imidisable derivative" of the acids as used herein is meant, in addition to the acids themselves, their anhydrides, diacid-diesters and tetraesters.

The derivatives of phenylene-bis-(4-hydroxymethylenephthalic) acids, which can be used in the form of their para-phenylene or metaphenylene isomers, are, for example, obtained by catalytic hydrogenation of the derivatives of the acids para- or meta-bis-(3,4-dicarboxybenzoyl)-benzene; these acids can be prepared as described in French Patent No. 1,565,700.

The aromatic tetracids of formula (V) are those in which R represents a tetravalent radical derived from a monocyclic aromatic hydrocarbon or from a polycyclic aromatic hydrocarbon, which may or may not be condensed, the aromatic rings being optionally bonded to one another by a valency bond or by an inert atom or group, such as an oxygen atom, a carbon atom, a carbonyl group or a SO₂ group.

By way of illustration, the tetracids of formula (V) can be defined as those in which R has the following meaning:

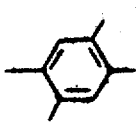 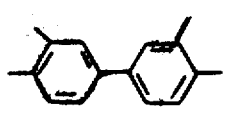

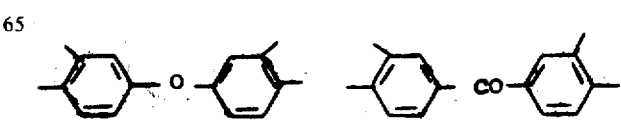

—Continued

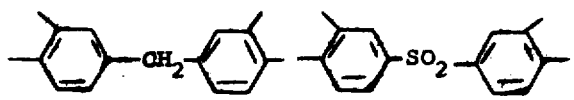

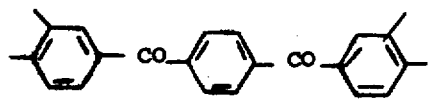

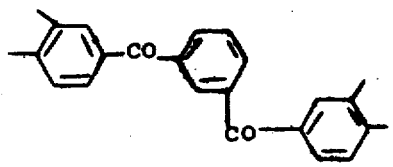

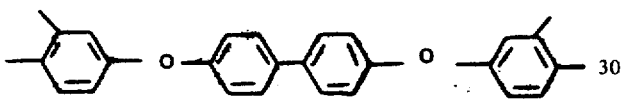

Amongst the tetracids of formula (V), meta- and para-bis-(3,4-dicarboxy-benzoyl)-benzene acids, diphenylmethanetetracarboxylic acids, benzophenonetetracarboxylic acids and diphenyl ether-tetracarboxylic acids are preferably employed. In particular, copolyimides consisting of recurring units derived from phenylene-bis-(4-hydroxymethylene-phthalic) acids (unit I) and of recurring units derived from (3,4-dicarboxy-benzoyl)-benzene acids (units II) and in which the proportion of units (II) relative to all of the units is between 40 and 70%, are very suitable for glueing polyimide or polyimide-amide films.

The symbol M in the diamine of formula (III) can, for example, represent a linear or branched alkylene radical with less than 13 carbon atoms, a phenylene radical, a cyclohexylene radical,

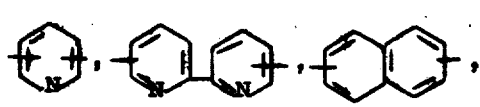

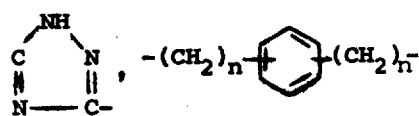

wherein $n$ represents an integer from 1 to 3. The symbol M can also comprise several phenylene or cyclohexylene radicals bonded to one another by a simple valency bond or by an inert atom or group such as —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—,

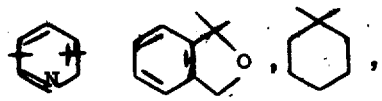

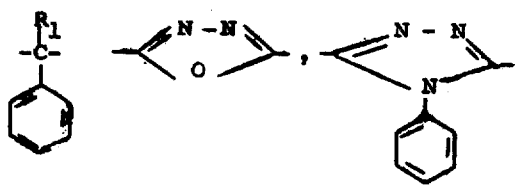

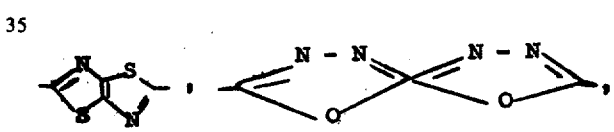

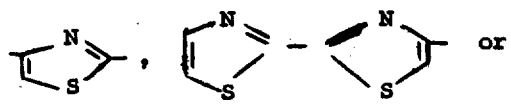

wherein $R_1$ represents a hydrogen atom, an alkyl radical with 1 to 4 carbon atoms, a phenyl radical or a cyclohexyl radical and X represents an alkylene radical with less than 13 carbon atoms. The various phenylene or cyclohexylene radicals can be substituted by, for example, methyl groups.

For preference, diamines of formula (III) in which M represents a phenylene group, or 2 or 3 phenylene groups linked to one another by an inert atom or group such as O, S, SO$_2$ or an alkylene group with 1 to 3 carbon atoms, are used.

Typical examples of diprimary diamines which may be used include 4,4'-diamino-dicylohexylmethane, 1,4-diamino-cyclohexane, 2,6-diamino-pyridine, metaphenylene-diamine, para-phenylene-diamine, 4,4'-diaminodiphenylmethane, 2,2-bis-(4-amino-phenyl)-propane, benzidine, 4,4'-diamino-phenyl ether, 4,4'-diamino-phenyl sulphide, 4,4'-diamino-diphenyl-sulphone, bis-(4-aminophenyl)-methylphosphine oxide, bis-(4-amino-phenyl)-phenylphosphine oxide, N,N-bis-(4-amino-phenyl)-methylamine, 1,5-diamino-naphthalene, meta-xylylene-diamine, paraxylylene-diamine, 1,1-bis-(para-aminophenyl)-phthalane, hexamethylene-diamine, 6,6'-diamino-2,2'-dipyridyl, 4,4'-diamino-benzophenone, 4,4'-diamino-azeobenzene, bis-(4-aminophenyl)-phenylmethane, 1,1-bis-(4-amino-phenyl)-cyclohexane, 1,1-bis-(4-amino-3-methyl-phenyl)-cyclohexane, 2,5-bis-(m-aminophenyl)-1,3,4-oxadiazole, 2,5,-bis-(p-aminophenyl)-1,3,4-oxadiazole, 2,5-bis-(m-aminophenyl)-thiazolo(4,5-d)thiazole, 5,5'-di-(m-aminophenyl)-2,2'-bis-(1,3,4-oxadiazolyl), 4,4'-bis-(p-aminophenyl)-2,2'-dithiazole, m-bis-[(4-p-aminophenyl)-2-thiazolyl]-benzene, 2,2'-bis-(m-aminophenyl)-5,5'-dibenzimidazole, 4,4'-diaminobenzanilide, phenyl 4,4'-diamino-benzoate, N,N'-bis-(4-amino-benzoyl)-p-phenylene-diamine, 3,5-bis-(m-aminophenyl)-4-phenyl-1,2,4-triazole, N,N'-bis-(p-amino-benzoyl)-4,4'-diamino-diphenylmethane, bis-p-(4-amino-phenoxycarbonyl)benzene, bis-p-(4-amino-phenoxy)-benzene, 3,5-diamino-1,2,4-triazole, 1,1-bis-(4-amino-phenyl)-1-phenyl-ethane and 3,5-bis-(4-amino-phenyl)-pyridine.

The imidisation reaction which gives rise to copolyimides possessing recurring units of formula (I) and (II) is suitably carried out in a solvent medium, keeping the reagents at a temperature of between 100° and 400°C until a homogeneous collodion of sufficient viscosity is obtained. The inherent viscosity is usually between 0.1 and 5 dl/g, and preferably between 0.15 and 2 dl/g, (measured at a concentration of 0.5 g per 100 cm$^3$ at 25°C). If the reaction takes place with elimination of water, it is possible to add small amounts of benzene, toluene or cyclohexane, and thus to remove the water by azeotropic distillation.

The amounts of reagents used should correspond roughly to the stoichiometric requirements of the reaction. When it is desired to obtain a statistical copolymer, it is possible to introduce the derivatives of the acids of formulae (IV) and (V) simultaneously into the diamine diluted in the solvent. When it is desired to prepare a "block" copolymer, each tetracid or its derivative is introduced successively and alternately into the diamine, in solution, and the partial imidisation reaction is allowed to go to completion before any new tatracid is added. As mentioned above, the reaction is suitably carried out in a polar solvent; this is generally used in an amount such that the concentrations of the resulting collodions are between 5 and 50%, preferably between 10 and 20%.

By employing any of the usual techniques, the collodions can be used for producing films or filaments. These films and filaments possess excellent heat-resistant properties. The collodions can also be used directly for coating polyimide or polyimide-amide films thus producing a good quality adhesive film for these materials.

The polyimides or the polyimide-amides which can be glued by means of an adhesive film made from a collodion of a copolyimide of this invention are suitably derived from a diprimary diamine similar to the diamine of formula (III) and from trifunctional or tetrafunctional aliphatic, cycloaliphatic, aromatic or heterocyclic polyacids. These polyimides and polyimide-amides are described in, for example, French Patents Nos. 1,256,203; 1,473,600; and 1,386,617 and in Netherlands Application No. 68/10,941.

Suitable dianhydrides which give rise to polyimide films, include the dianhydrides of the following acids: pyromellitic acid, naphthalene-2,3,6,7-tetracarboxylic acid, perylene-3,4,9,10-tetracarboxylic acid, diphenyl-3,3',4,4'-tetracarboxylic acid, diphenylmethane-3,3',4-,4'-tetracarboxylic acid, ethylene-tetracarboxylic acid, cyclopentadienyl-tetracarboxylic acid, 2,2-diphenyl-propane-3,3',4,4'-tetracarboxylic acid, diphenyl-sulphone-3,3',4,4'-tetracarboxylic acid, cyclopentane-tetracarboxylic acid, benzophenone-3,4,3',4', tetracarboxylic acid, azoxybenzene-3,3',4,4'-tetracarboxylic acid, azobenzene-3,3',4,4'-tetracarboxylic acid and diphenyl ether-3,3',4,4'-tetracarboxylic acid.

Suitable dianhydrides of triacids which can be used include trimellitic anhydride and the anhydrides of the following acids: naphthalene-2,3,6-tricarboxylic acid, diphenyl-3,4,4'-tricarboxylic acid, naphthalene-1,2,5-tricarboxylic acid, diphenylsulphone-3,4,3'-tricarboxylic acid, diphenyl ether-3,4,4'-tricarboxylic acid, cyclopentadiene-1,2,4-tricarboxylic acid and benzophenone-3,4,4'-tricarboxylic acid.

The adhesive film can be deposited on one face or on both faces of the polyimide or polyimide-amide film, hereafter referred to as "support film S". The latter can have been stretched and its surface can optionally have been improved by electrical discharge. The dimensions of the support film are not critical. In general, films, the thickness of which is between 10 and 200 microns, are used. If necessary, the films can be cleaned first, for example using trichloroethylene. The adhesive film is deposited in one or more stages, either by soaking, by spreading or by spraying the collodion. In general, the solvent with which the collodion containing the copolymer having recurring units (I) and (II) is produced, is not a solvent for the polyimide or polyimide-amide support. If, however, it is a solvent for the support it may be necessary to isolate the copolyimide of this invention from the collodion and then to redissolve it in a solvent which does not dissolve the support films. Suitable such solvents include dioxane, acetophenone, cyclohexane, cresol and tetrahydrofurane. However, if very concentrated collodions of the copolyimide are used, it is generally possible to employ a solvent which partially dissolves the support film, without detrimental effects.

The quantity of collodion employed is such that the amount of copolyimide deposited is generally between 5 and 30 g/m$^2$ of surface area coated, preferably between 10 and 20 g/m$^2$. If desired, the solvent can be partially or practically completely removed by simple heating in a ventilated or unventilated atmosphere, for example at a temperature of between 50° and 150°C, under reduced pressure or at atmospheric pressure.

The adhesive films of this invention can be used for many purposes; they are very especially suitable for glueing printed circuits in electronics and for wrapping electrical conductors. These films can also be employed for producing composite materials by successive glueing of several layers of film.

The adhesion of the films to various supports can generally be achieved at a temperature of between 150° and 350°C, under a pressure from 0.01 to 1 kg/cm². The duration of the glueing, which can be carried out in a press or in a calender, can vary from, for example, a few seconds to 30 minutes. The assembled object can be reheated subsequently, especially if the glueing is carried out quickly.

The following Examples further illustrate the present invention, the adhesive strength is determined according to Standard Specification ASTM D 1876-61-T (referred to as "peeling-test").

EXAMPLE 1

A statistical polyimide copolymer containing, in a 50/50 ratio, imide units of the formula:

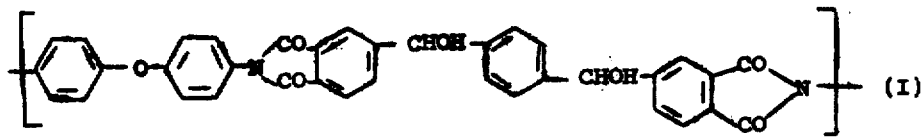

and

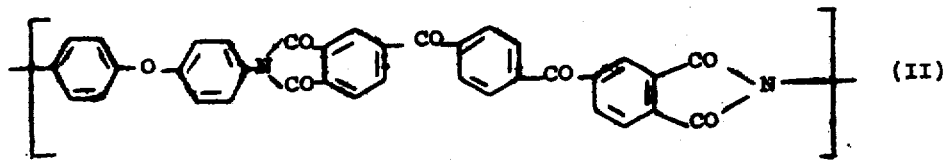

is prepared by introducing 2.135 g of para-bis-(3,4-dicarboxybenzoyl)-benzene anhydride, 2.416 g of p-phenylene-bis-(4-hydroxymethylene-phthalic) acid, 2.002 g of 4,4'-diaminodiphenyl ether and 35.1 g of cresol into a flask. The resulting reaction mixture is heated for 1 hour at 150°C, and, after cooling, a collodion is obtained which has the following characteristics:

concentration: 14.6%
inherent viscosity: 0.84 dl/g.

This collodion is spread on a glass plate and dried for 1 hour at 120°. The film thus obtained is then dried, under tension, for 30 minutes at 300°C; its tensile breaking strength is initially 11.0 kg/mm². It is still 9.7 kg/mm² after 2,012 hours at 250°C.

EXAMPLE 2

A polyimide copolymer collodion, identical to that described in Example 1, is prepared and is used to brush-coat a 28 cm × 14 cm × 0.005 cm polyamide-imide film, obtained by polycondensation of trimellitic anhydride and 4,4'-diisocyanato-diphenyl ether. The film is then dried for 1 hour at 100°C; the weight of the dry coating is 0.83 g, corresponding to 21 g/m² (proportion of cresol in the residual coating approximately 18%). The film is then cut into two equal parts which are arranged so as to glue the coated face of the one to the coated face of the other. Glueing is carried out on a temperature controlled calender at 200°C. Three passes are carried out between the rollers, the separation of which is reduced with successive passes. The glueings are then reheated for 24 hours at 200°C.

The adhesive strength, which corresponds to the force necessary to break the film, is measured by the peeling-test: it is 0.67 kg/cm, measured at 25°C. After 2,000 hours at 250°C this adhesive strength is still 0.10 kg/cm. In every case, it corresponds to breakage of the film.

EXAMPLE 3

A copolymer consisting of polyimide blocks, containing the same individual units as those of Example 1, is prepared by introducing 7.11 g of p-phenylene-bis-(4-hydroxymethylenephthalic) acid, 6.006 g of 4,4'-diaminodiphenyl ether and 70.1 g of cresol into a flask. The reaction mixture is heated for 1 hour at 150°C.

After cooling, 6.94 g of para-bis-(3,4-dicarboxy-benzoyl)benzene acid and 31.3 g of cresol are introduced. The reaction mixture is heated again at 150°C for 1 hour 30 minutes. On cooling, a collodion with the following characteristics is then obtained:

concentration: 15% inherent viscosity: 0.62 dl/g.

9 g of this collodion are used to brush-coat a 34 cm × 22 cm × 0.005 cm polyamide-imide film, identical to that of Example 2 (surface area coated 14 × 34 cm). The film is then dried for 45 minutes at 120°C; the weight of the dry coating is 0.83 g, which represents 17.4 g/m² (proportion of cresol remaining in the coating; 12%). The glueing is carried out as in Example 2.

The adhesive strength is 0.43 kg/cm, measured at 25°C, and 0.38 kg/cm measured at 200°C. After 1,061 hours at 250°C, the adhesive strength is 0.09 kg/cm measured at 25°C and 0.18 kg/cm measured at 200°C; it always corresponds to breakage of the film and not to peeling.

EXAMPLE 4

A copolymer consisting of polyimide blocks, containing the same individual units as those of Example 1, the proportion of the imide units of formula (I) being 30% relative to the total number of units of formulae (I) and (II), is prepared by introducing 1.428 g of para-bis-(3,4-dicarboxy-α-hydroxy-benzyl)-benzene anhydride (0.003 mol), 2.002 g of 4,4'-diamino-diphenyl ether (0.010 mol) and 19.3 g of m-cresol into a reactor. This mixture is heated to 150°C and kept at 150°C for 1 hour. After cooling the reaction mixture, 2.9897 g of para-bis-(3,4-dicarboxy-benzoyl)-benzene anhydride (0.007 mol) and 14.45 g of m-cresol are added. The solution is heated again at 150°C for 1 hour.

The characteristics of the collodion are as follows:
concentration: 15%
inherent viscosity: 1.18 dl/g.

This collodion gives identical results to those of the preceding Examples for glueing polyamide-imide films.

EXAMPLE 5

A copolymer consisting of polyimide blocks, containing the two following recurring units:

racarboxylic anhydride and 24.6 g of cresol are added. The mixture is heated again at 150°C for 1 hour. On cooling, a collodion with the following characteristics is then obtained:
concentration: 15%
inherent viscosity: 0.88 dl/g.

8.6 g of this collodion are used to brush-coat a 34 cm × 22 cm × 0.005 cm polyamide-imide film (surface area coated 34 × 14 cm). The film is then dried for 45 minutes at 120°C; the weight of the dry coating is 0.63 g, which represents 13 g/m$^2$ (proportion of cresol remaining in the coating: 9%). Glueing is carried out in Example 2.

The adhesive strength is 0.38 kg/cm measured at 25°C and 0.45 kg/cm measured at 200°C.

EXAMPLE 6

A copolymer consisting of polyimide blocks, containing the two following recurring units:

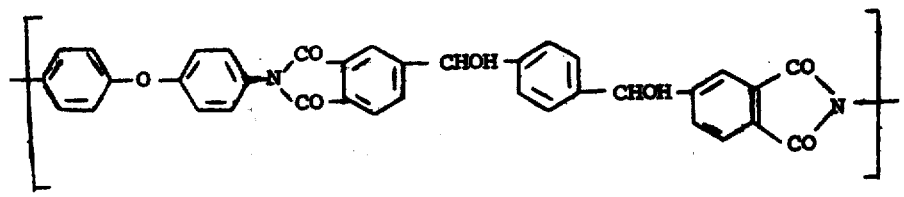

and

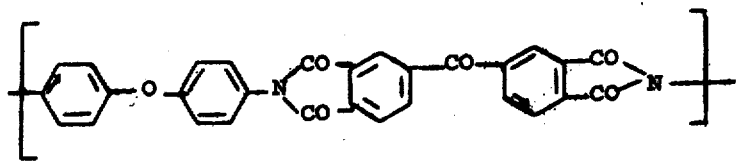

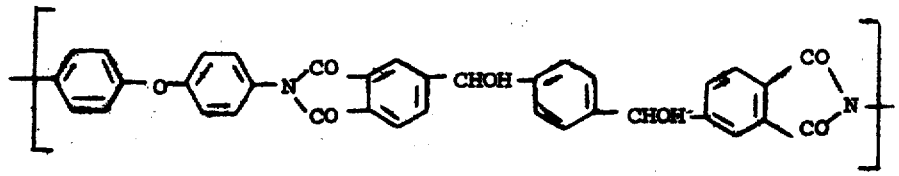

and

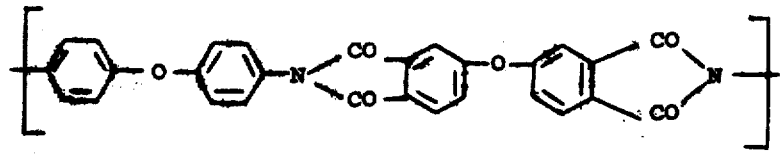

is prepared by introducing 9.490 g of p-phenylene-bis-(4-hydroxymethylene-phthalic)-acid, 8.008 g of 4,4'-diaminodiphenyl ether and 99.3 g of cresol into a flask. The reaction mixture is heated for 40 minutes at 150°C. After cooling, 6.516 g of benzophenone-3,3',4,4'-tetis prepared by introducing 4.745 g of para-bis-(3,4-dicarboxy-α-hydroxy-benzyl)-benzene (0.01 mol), 4.004 g of 4,4'-diamino-diphenyl ether (0.02 mol) and 45 g of cresol into a reactor. The mixture is heated to 150°C and kept at 150°C for 45 minutes. After cooling, 3.142 g of diphenyl ether-3,3',4,4'-tetracarboxylic anhydride (0.01 mol) and 16.3 g of cresol are added. This reaction mixture is kept at 150°C for 1 hour. A limpid and viscous collodion with the following characteristics is obtained:
concentration: 15%
inherent viscosity; 1.22 dl/g.
Glueing is carried out according to the process described in Example 2. The adhesive strength is 0.34 kg/cm.

We claim:
1. An adhesive imide copolymer consisting essentially of recurring units of the formula:

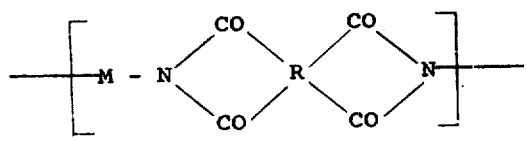

(II)

and at least 20% of recurring units of the formula;

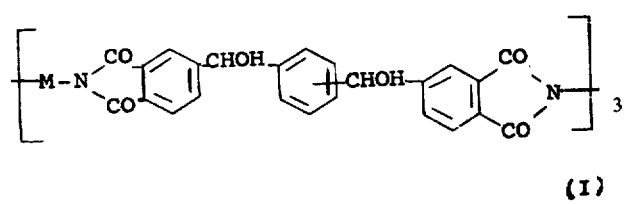

(I)

in which M represents an aliphatic or aromatic divalent radical and R represents a tetravalent aromatic radical.

2. A copolymer according to claim 1 in which the recurring units of formula (II) have the formula:

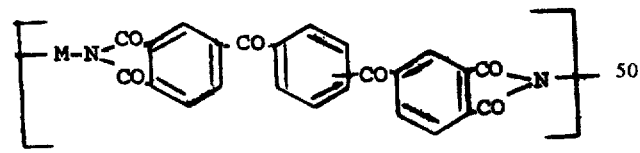

3. A copolymer according to claim 1 in which the recurring units of formula (II) have the formula:

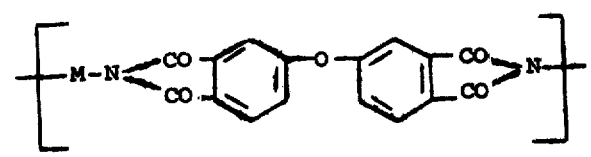

4. A copolymer according to claim 1 in which the recurring units of formula (II) have the formula:

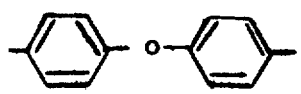

5. A copolymer according to claim 1 in which M represents a phenylene group, or two or three phenylene groups linked together by an —O—, —S— or —SO$_2$— group, or an alkylene group with 1 to 3 carbon atoms.

6. A copolymer according to claim 5 in which M represents a

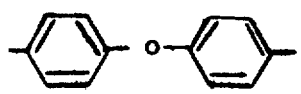

radical.

7. An adhesive imide copolymer consisting essentially of:
40 to 70% of recurring units of the formula:

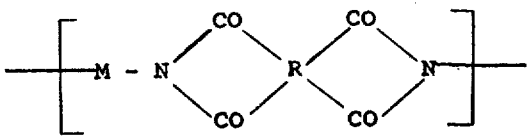

and 60 to 30% of recurring units of the formula:

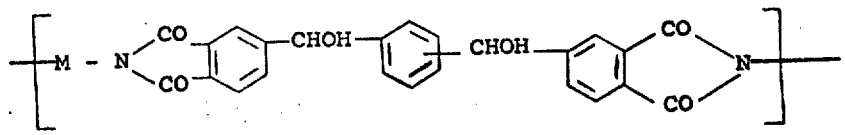

in which M represents an aliphatic or aromatic divalent radical and R represents a tetravalent aromatic radical.

8. Process for producing an adhesive imide copolymer as defined in claim 1 which comprises reacting, at a temperature between about 100° and 400°C., a diprimary diamine of the formula:

in which M is as defined in claim 1, with a mixture of imidisable derivatives selected from acids, anhydrides, diacid-diesters and tetraesters, at least 20 mole % of which is a derivative of a phenylene-bis-(4-hydroxymethylenephthalic) acid of the formula:

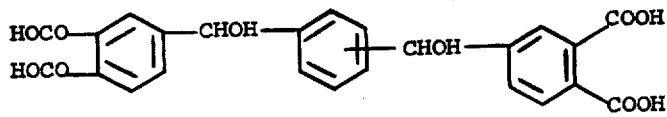

the remainder of the mixture being an imidisable derivative of an aromatic tetracid of the formula:

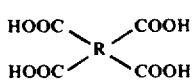

in which R is as defined in claim 1, either simultaneously or separately.

9. Process according to claim 8, which is carried out in a solvent until the inherent viscosity is between about 0.15 and 2 dl/g (measured at a concentration of 0.5 g per 100 cm$^3$ at 25°C).

10. An adhesive composition which comprises a solution of an imide copolymer as defined in claim 1.

* * * * *